March 20, 1956  H. G. NELSON  2,738,587
CHEAT-PROOF DIPSTICK
Filed Sept. 8, 1954
Fig. 1.
Fig. 2.
Fig. 3.
Fig. 4.
Fig. 5.
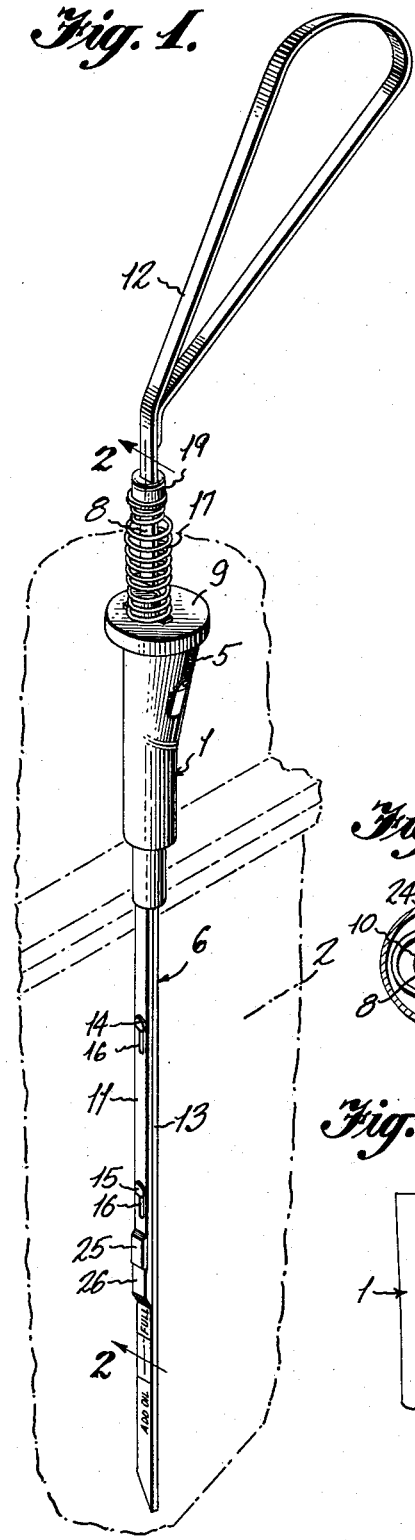
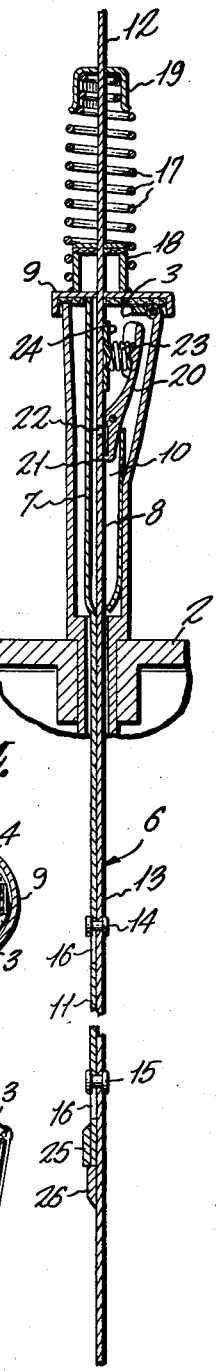
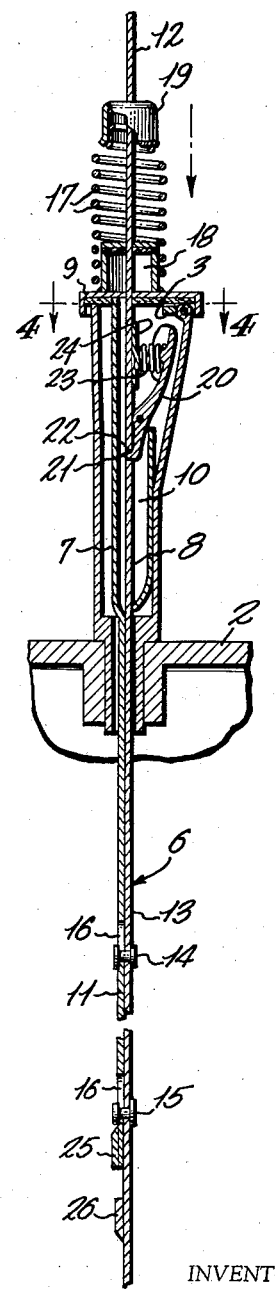
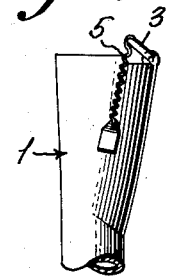
INVENTOR
Harold G. Nelson
BY Mason, Fenwick & Lawrence
ATTORNEYS United States Patent Office
2,738,587
Patented Mar. 20, 1956

2,738,587
CHEAT-PROOF DIPSTICK
Harold G. Nelson, Bloomington, Ill.

Application September 8, 1954, Serial No. 454,787

2 Claims. (Cl. 33—126.7)

This invention relates to dipsticks for indicating the level of oil in the crankcase of an internal combustion engine.

After the attendant at the filling station has withdrawn and wiped the dipstick, he reinserts it presumably to its full depth and withdraws it again for inspection by the customer to show the oil level with respect to "full" and "low" indicia marked on the dipstick. If the attendant is minded to make an unnecessary sale of oil, he may not insert the dipstick to its full depth so that it indicates to the customer a fictitious low oil level.

The object of the present invention is to provide a dipstick incorporating means for indicating to the customer whether or not the dipstick has been fully inserted. The object more specifically stated, is to provide a dipstick formed of two lapping sections slidably connected by a pin and slot connection for definite and limited extension, normally spring retracted, one section carrying a cap which fits the outer end of the dipstick tube and limits the extent of insertion of said section, and the other section including a handle by means of which said section may be slidably extended beyond the first named section by pushing it in against the tension of the spring, there being a spring engaged latch on one section engaging the other when it has been pushed in for a predetermined distance to limit its inward movement and to hold the sections extended. A pair of indicia, one on each section, are in close juxtaposition when said sections are in contracted relation. Said indicia stand apart when the sections are extended. It is the spaced position of these indicia that tell the customer that the dipstick has been pushed in to its full depth. A unidirectional pawl at the mouth of the dipstick tube in the path of the latch, yields to permit the dipstick to be withdrawn in extended state, but stands rigidly in the path of the latch when the extended dipstick is reinserted, releasing the latch, thereby restoring the dipstick to contracted position.

Other objects of the invention will appear as the following description of a practical embodiment thereof proceeds.

In the drawing which accompanies and forms a part of the following specification, and throughout the figures of which the same reference characters have been employed to denote identical parts:

Figure 1 is a perspective view of the dipstick and tube therefor constituting the present invention;

Figure 2 is a longitudinal section through the dipstick and dipstick tube showing the dipstick in contracted position;

Figure 3 is a similar view showing the dipstick in extended position, the lower end being omitted;

Figure 4 is a fragmentary sectional view through the upper part of the dipstick tube, taken in an axial plane showing the latch releasing pawl in raised position; and Figure 5 is a fragmentary side view of the upper end of the dipstick receiving tube.

Referring now in detail to the several figures, the dipstick is employed in combination with a special dipstick receiving tube 1, which may be furnished as part of the engine or sold as a substitute accessory to take the place of the conventional dipstick receiving tube.

In the drawing the tube 1 is mounted in a hole in the engine block which is above the crankcase 2 and communicates therewith. The tube 1 flares somewhat toward its mouth to receive a correspondingly enlarged portion of the dipstick. A pawl 3 is hingedly mounted at the periphery of the mouth of the tube 1, partly occluding said mouth. It has the form of a flat plate with an arcuately indented edge 4. It preferably rests against the peripheral edge of the mouth, the portion of the edge which it overlies being recessed to a depth equal to the thickness of said plate so that the outer side of said plate lies flush with the outer end of the dipstick receiving tube.

The pawl 3 is normally pulled against the end of the tube 1 by the spring 5. Its movement is, therefore, unidirectional with respect to the plane of the end of the dipstick receiving tube. It yields to pressure from within, but is immovable to pressure from without.

The dipstick, which as a whole is designated by the numeral 6, is in the exemplary embodiment shown, made of two sections 7 and 8, the section 7 being relatively short and having a cap 9 near its outer end which fits over the mouth of the dipstick receiving tube 1, closing it. Below the cap, the section 7 has a tubular portion 10 which fits within the flared portion of the dipstick receiving tube. Below the tubular portion 10, the section 7 is a flat stiff blade 11.

The section 8, which is relatively long, extends through the tubular portion 10 of the shorter section and through a slot in the cap and beyond, the outer part 12 being bent to form a handle. The lower part 13 of the section 8 lies against the blade 11 slidably longitudinally therealong, being connected thereto by pin and slot connections 14 and 16, the range of sliding movement being determined by the length of the slots 16.

The section 8 is normally retracted by means of a spring 17, the lower end of which fits about a spring retaining boss 18 fixed to the cap 9, and the upper end of which is seated within a dished collar 19 fixed to the section 8 below the handle. When the section 8 is retracted the pins 14 connecting them are stopped by the upper ends of the slots 16.

A latch having the form of a rocking lever 20 is pivoted at a point intermediate its length at the outer end of the tubular portion 10, its lower part extending within said tubular portion and its upper part being exposed through an opening in the forward part of said tubular portion. The lower end of the rocking lever 20 is provided with a tit 21, which when the section 8 is extended substantially to its limit by pushing it down with the handle, falls into a hole 22 in the section 8 and latches the section 8 in its extended position against the pressure of the spring 17. The tit end of the rocking lever is pressed against the section 8 by the spring 23 positioned in compression between the outer end of the rocking lever and a plate 24 extending across the tubular portion 10 and forming part thereof, behind which the section 8 is slidable.

The sections 7 and 8 of the dipstick have the juxtaposed indicia plates 25 and 26, the former being at the lower end of the short section 7, while the latter is located at such point on the section 8 as to lie substantially contiguous to the plate 25 when the dipstick is contracted. Said plates, therefore, lie apart while the dipstick is extended, a distance determined by the point in the longitudinal traverse of the section 8 at which the tit 21 falls into the hole 22. It is the spread relation of the plates 25 and 26 that indicates to the customer that the dipstick has been fully inserted into the crankcase.

It will be noted that when the tit 21 is within the hole 22, the position of the parts when the dipstick is extended, the upper end of the rocking lever stands out so that its path of movement as the dipstick is withdrawn is intersected by the pawl 3. When the extended dipstick is withdrawn, the upper end of the rocking lever presses the pawl 3 outward against the bias of the spring 5, permitting the free movement of the dipstick. When the extended dipstick is returned to the tube 1, the upper end of the rocking lever 20 encounters the pawl 3 from a direction in which the pawl is immovable, said pawl depressing the upper end of the rocking lever until the tit 21 comes out of the hole 22, releasing the section 8, which is immediately pulled up into contracted position by the spring 17. Thus, each time the dipstick is returned to the tube 1 in extended condition, the spaced relation of the indicia plates 25 and 26 is cancelled out, it being necessary at each insertion for the attendant to push the handle section in to its full extent in order for the indicia plates to move fully apart and become held in spaced relation.

Normally, the pawl 3 acts as a keeper to hold the dipstick in place, preventing it from bouncing out on rough roads, for the outer end of the rocking lever 20 having passed the pawl 3, moves out beneath said pawl somewhat, under the urge of the spring 23, being retained by said pawl under pressure of the pawl spring 5.

While I have in the above description disclosed what I believe to be a practical embodiment of the invention, it will be understood by those skilled in the art that the specific details of construction and arrangement of parts, as shown and described are by way of example and not to be construed as limiting the scope of the invention.

What I claim is:

1. In combination, a dipstick for indicating the level of oil in the crankcase of an internal combustion engine and a dipstick receiving tube the latter being mounted on the engine and having its bore directed toward the crankcase, said dipstick being made in two sections slidably related including a short section having a cap thereon for closing the mouth of said tube functioning as a stop to limit the extent of insertion of said short section through said tube whereby the mouth end of the tube is the datum from which the extent of insertion of the dipstick into the crankcase is measured, and a long section extending beyond said short section at its lower end, a spring normally holding said sections retracted, said long section extending through said cap and having a handle at its upper end for pushing it downward against the bias of said spring to extend said dipstick, latch means on said sections for holding them extended, correlated indicating means on the respective sections becoming relatively spaced when said dipstick is extended, and latch releasing means carried by said tube in the path of said latch means when said dipstick is withdrawn or inserted, operative to release said latch means each time said extended dipstick is inserted into said tube.

2. Dipstick as claimed in claim 1, said latch means comprising a rocking lever pivoted on said short section and having one end spring pressed against said long section, the latter having a hole registrable with the contiguous end of said rocking lever in the extended position of said long section into which said end of said rocking lever enters under spring bias to hold said long section extended, said latch releasing means including a unidirectional pawl spring-controlled to yield outwardly to permit the extended dipstick to be removed, but stopped from moving inwardly by contact with the outer end of said tube and engageable with the opposite end of said rocking lever for releasing said latch.

References Cited in the file of this patent

UNITED STATES PATENTS 2,127,835     Tower _____ Aug. 23, 1938